//patents.google.com patent text

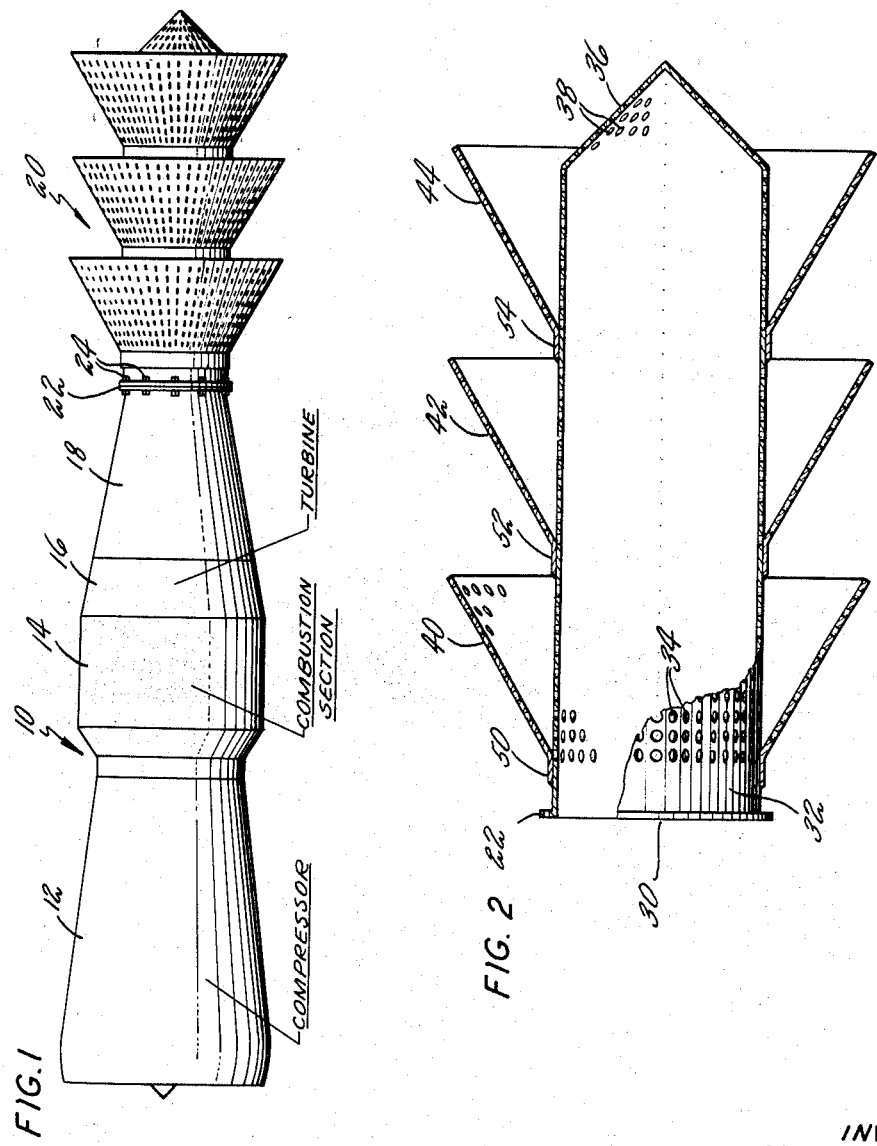

United States Patent Office 2,926,744
Patented Mar. 1, 1960

2,926,744
JET SILENCER

George B. Towle, Glastonbury, and Jack W. Davis, East Hartford, Conn., assignors to United Aircraft Corporation, East Hartford, Conn., a corporation of Delaware Application March 13, 1957, Serial No. 645,787

2 Claims. (Cl. 181—55)

This invention relates to jet power plants and more particularly to silencing mechanisms for the exhaust nozzles of these power plants.

It is an object of this invention to provide a silencer for a jet exhaust nozzle with the silencer comprising a cylindrical or tubular extension of the nozzle with the extension having a plurality of holes or perforations therein.

It is a further object of this invention to provide a series of baffles which surround the extension and diverge in a downstream direction to prevent recirculation of the exhaust gases into the power plant and to prevent overheating of adjacent structure such as the engine, pylon support or wing.

A still further object of this invention is to provide baffles which are perforated but which have a relatively small open area for greatly reducing the noise which may be caused by pressure fluctuations building up along the wall of the deflectors.

These and other objects of this invention will become readily apparent from the drawing in which:

Fig. 1 is a schematic showing of a turbine type power plant having a jet exhaust silencer according to this invention; and Fig. 2 is an enlargement of the silencer mechanism of Fig. 1.

Referring to Fig. 1, a turbine type jet power plant is generally indicated at 10. The power plant includes a compressor section 12, a combustion section 14, a turbine section 16 and an exhaust nozzle 18. The exhaust nozzle 18 terminates in an aft opening from which the hot gases are emitted. The nozzle 18 has a silencer generally indicated at 20 attached to the aft end of the nozzle 18 by means of a suitable flange 22 and bolts 24.

As best seen in Fig. 2, the silencer 20 comprises an upstream opening 30 for receiving the exhaust gases from the exhaust nozzle 18. The silencer 20 comprises a cylindrical or tubular member 32 which extends in an aft direction from the exhaust nozzle 18 and includes longitudinal extending walls having a plurality of holes or perforations therein. The aft or trailing end of the cylindrical member 32 terminates in a closure 36 which may also include a number of holes or perforations 38.

In order to normally prevent recirculation of exhaust gases into the power plant, a plurality of baffles or deflectors 40, 42, and 44 are provided. In the past these baffles had been made solid, and pressure fluctuations along the deflector created noise which reduced the effectiveness of the silencer. Solid or imperforate baffles are shown in patent application Serial No. 581,418, filed April 30, 1956, by Tyler and Towle. By having the baffles or deflectors such as 40, 42, and 44 perforated with a relatively small opening area, not only is recirculation and overheating avoided but this will provide a substantially lower noise level. Depending upon the particular conditions, the perforated baffles should have an angle relative to the longitudinal axis of the silencer which is in the range of 20° to 50°.

The baffles 40, 42, and 44 have flanges 50, 52, and 54, respectively, which are suitably attached to the tube 32 as by welding or rivets. The flanges form the leading edges of the baffles and the flange 52 is substantially aligned with the trailing edge of the baffle 40. The relationship of the leading edge of one baffle to the trailing edge of the next upstream baffle is a distance apart in the range 0 to .4$l$ where $$l = \frac{\text{length of the sound suppressor tube 32}}{\text{number of baffles}}$$

As a result of this invention it is apparent that a highly efficient yet lightweight silencer mechanism has been provided which will reduce the noise level of jet engines by a marked degree.

Although only one embodiment of this invention has been illustrated and described herein, it will become readily apparent that various changes and modifications may be made in the construction and arrangement of the various parts without departing from the scope of this novel concept.

What is desired by Letters Patent is:

1. In an exhaust nozzle for a jet exhaust, a tubular member extending aft of said exhaust nozzle and having a jet exhaust receiving opening adjacent its upstream end, said tubular member having longitudinally extending side walls and a closure at its downstream end, said side walls and said closure being perforated to emit gases to the free airstream, a plurality of perforated frusto-conical baffles having inner and outer ends and extending radially from said tubular member and surrounding said member to deflect the emitted gases in a downstream direction, the perforations in said baffles presenting a relatively low open area, said baffles having walls which diverge in a downstream direction, said baffles having their outer ends free and located downstream of said inner ends, and mounting means for securing the inner ends of said baffles to said member which inner end abuts said member, each of said baffles having its downstream edge approximately aligned with the upstream end of the next adjacent downstream baffle along the longitudinal axis of said member.

2. In an exhaust nozzle for a jet exhaust, a tubular member extending aft of said exhaust nozzle and having a jet exhaust receiving opening adjacent its upstream end, said tubular member having longitudinally extending side walls and a closure at its downstream end, said tubular member having a longitudinal axis, said side walls and said closure being perforated to emit gases to the free airstream transversely of the longitudinal axis of said member, a plurality of perforated frusto-conical baffles having inner and outer ends and extending radially from said tubular member and surrounding said member to deflect the emitted gases in a downstream direction, the perforations in said baffles presenting a relatively low open area, said baffles having walls which diverge in a downstream direction at an angle relative to the longitudinal axis of said member which angle is in the range between 20° and 50°, said baffles having their outer ends free and located downstream of said inner ends, and mounting means for securing the inner ends of said baffles to said member which inner end abuts said member and comprises the upstream end of the baffle, each of said baffles having its downstream edge approximately aligned with the upstream end of the next adjacent downstream baffle along the longitudinal axis of said member and the distance between said upstream and downstream edges and said adjacent baffles being in the range of 0 to .4$l$ where $$l = \frac{\text{length of the tubular member}}{\text{number of baffles}}$$

(References on following page)

References Cited in the file of this patent

UNITED STATES PATENTS

| | | |
|---|---|---|
| 787,860 | Sharpe | Apr. 18, 1905 |
| 1,401,368 | Schneebeli | Dec. 27, 1921 |
| 1,685,006 | Schultz | Sept. 18, 1928 |

FOREIGN PATENTS

| | | |
|---|---|---|
| 546,538 | Germany | Mar. 15, 1932 |
| 851,012 | France | Sept. 25, 1939 |